(12) United States Patent
Owens

(10) Patent No.: US 6,184,830 B1
(45) Date of Patent: Feb. 6, 2001

(54) COMPENSATION OF DIRECTION FINDING ESTIMATES FOR POLARIMETRIC ERRORS

(75) Inventor: Mark A. Owens, Tucson, AZ (US)

(73) Assignee: Raytheon Company, Lexington, MA (US)

( * ) Notice: Under 35 U.S.C. 154(b), the term of this patent shall be extended for 0 days.

(21) Appl. No.: 09/129,019

(22) Filed: Aug. 4, 1998

Related U.S. Application Data

(60) Provisional application No. 60/061,051, filed on Oct. 2, 1997.

(51) Int. Cl.$^7$ ........................................... G01S 5/02
(52) U.S. Cl. ...................... 342/424; 342/368; 342/377; 342/417; 342/420; 342/422; 342/423; 342/442
(58) Field of Search .................. 342/368, 377, 342/385, 417–449

(56) References Cited

U.S. PATENT DOCUMENTS 5,541,608 * 7/1996 Murphy et al. ................... 342/442
5,608,411 * 3/1997 Rose ................................... 342/417

* cited by examiner

Primary Examiner—Bernarr E. Gregory
(74) Attorney, Agent, or Firm—David W. Collins; Glenn H. Lenzen, Jr.

(57) ABSTRACT

An algorithmic technique which allows antenna arrays that are used for interferometric direction finding to have elements with arbitrary orientation. This technique allows the phase errors associated with non-identical element orientation to be estimated, without explicit knowledge of either the polarimetrics of the array elements or the polarimetrics of the source. It relies upon the fact that there exists a single number which describes the polarimetric interaction, and that this number can be estimated and then utilized to remove the phase component due to polarimetric interaction. This technique makes it feasible to incorporate direction finding arrays into articles that could benefit from such arrays, but because of size or shape constraints, were previously not able to do so.

11 Claims, 2 Drawing Sheets

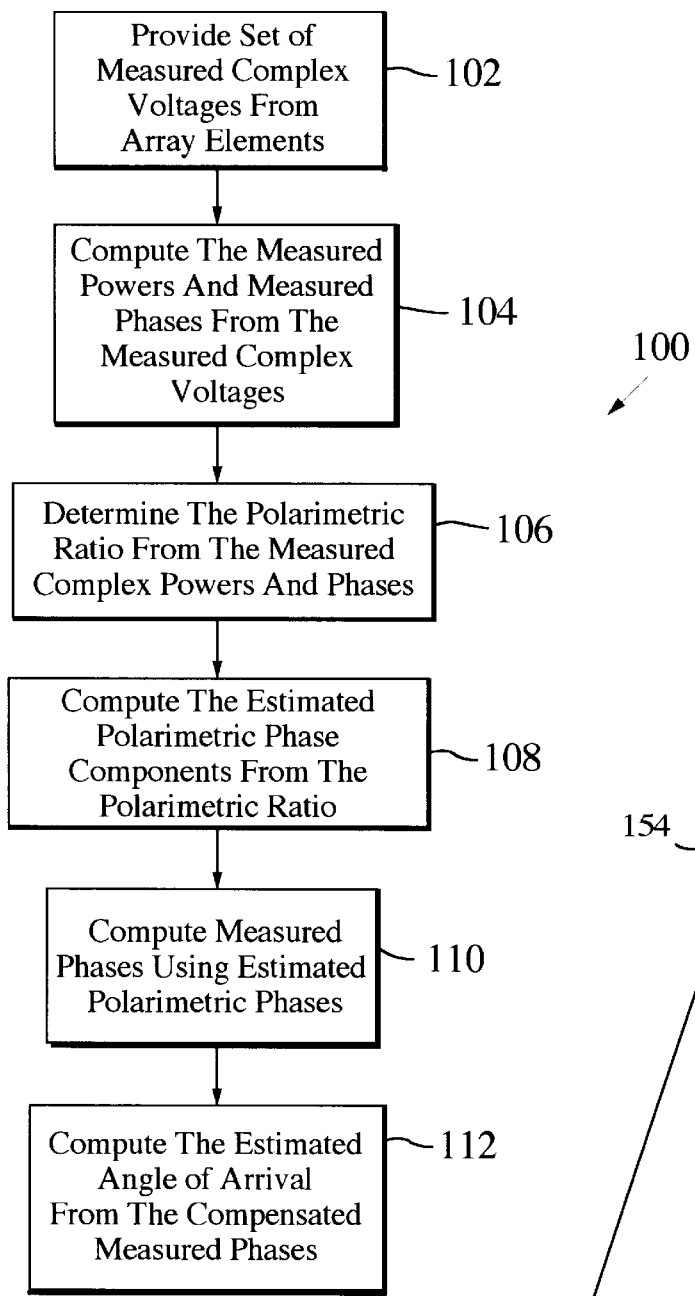
FIG. 2
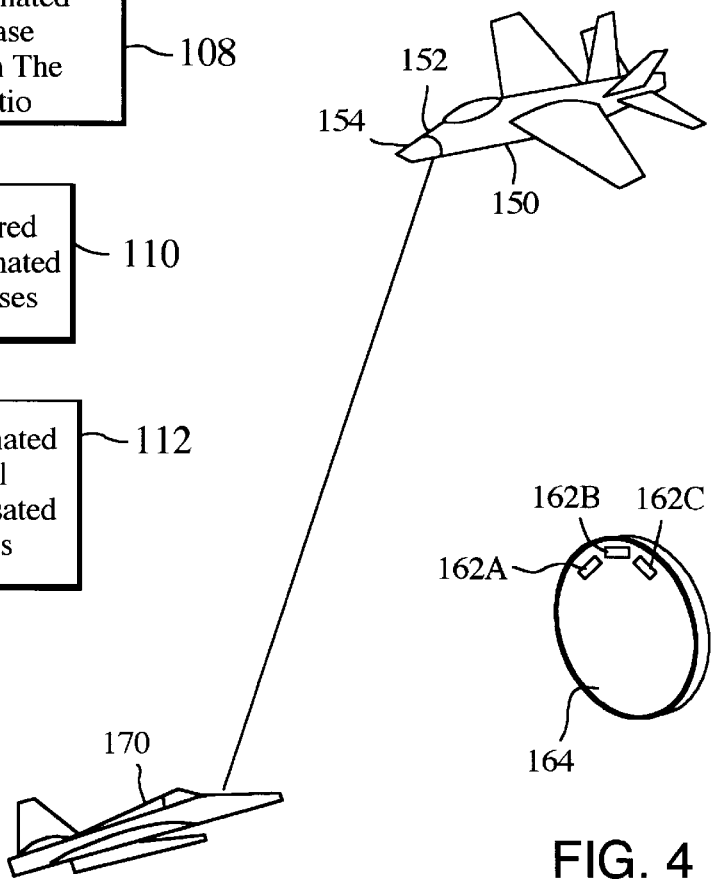
FIG. 3
FIG. 4

US 6,184,830 B1

COMPENSATION OF DIRECTION FINDING ESTIMATES FOR POLARIMETRIC ERRORS

TECHNICAL FIELD OF THE INVENTION

This application claims priority from Provisional Application No. 60/061,051, filed Oct. 2, 1997.

This invention relates to antenna arrays, and more particularly to a compensation technique that allows antenna arrays used for interferometric direction finding to have elements with arbitrary orientation.

BACKGROUND OF THE INVENTION

In the past, interferometric direction finding arrays used elements with identical spatial orientation in order to avoid the difficulties associated with polarimetrics. Normally such arrays must have elements with identical orientation since the polarimetric sense of the impinging signal affects the received phase.

This invention allows such arrays to have elements with orientations based on other criteria, such as fitting the elements into an existing space or conforming to surface.

SUMMARY OF THE INVENTION

In accordance with one aspect of the invention, an algorithmic technique is described which allows antenna arrays that are used for interferometric direction finding to have elements with arbitrary orientation. This technique allows the phase errors associated with non-identical element orientation to be estimated, without explicit knowledge of either the polarimetrics of the array elements or the polarimetrics of the source. It relies upon the fact that there exists a single complex number (herein referred to as $\zeta$) which describes the polarimetric interaction, and that this number can be estimated and then utilized to remove the phase component due to polarimetric interaction. It is the recognition of the existence of this number and the fact that it can be calculated which forms the basis of this aspect of the invention.

This invention makes it feasible to incorporate direction finding arrays into articles that could benefit from such arrays, but because of size or shape constraints, were not able to do so. Examples of such articles are cellular and satellite telephone equipment, aircraft and vehicular collision avoidance systems, radars and radar warning systems, guided missiles and homing devices, law enforcement personnel locators, and satellite systems.

BRIEF DESCRIPTION OF THE DRAWING

These and other features and advantages of the present invention will become more apparent from the following detailed description of an exemplary embodiment thereof, as illustrated in the accompanying drawings, in which:

FIG. 2 is a simplified flow diagram of an exemplary technique for estimating the direction of arrival of a signal, implemented in the system of FIG. 1.

FIG. 3 is a conceptual illustration of an aircraft employing a direction finding system in accordance with an aspect of the invention.

FIG. 4 is a simplified diagram of a direction finding array for a direction finding system mounted on available spaces of an active planar array radar mounted on an aircraft.

DETAILED DESCRIPTION OF THE PREFERRED EMBODIMENT

Consider the simple case of a two element interferometer, where each element is aligned with the baseline, and with a source lying directly ahead of the two elements on a line normal to the baseline. In this case, the electrical phase at each element would be equal, and the measured direction of arrival (solid angle from baseline) would be 90 degrees.

Figure 1A:
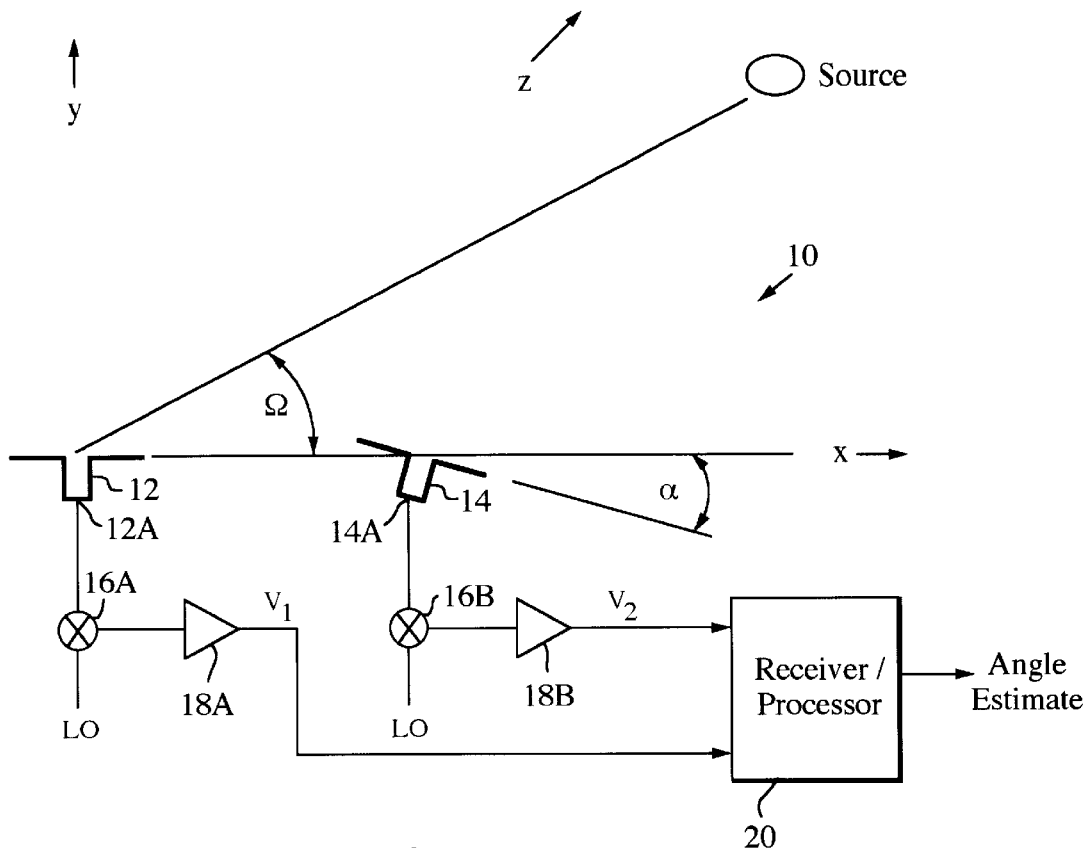
FIG. 1A is a simplified block diagram of a direction finding system employing the present invention.

Now let one of the two elements be rotated by a known angle of $\alpha$ degrees with respect to the other first element, as shown in FIG. 1A. Here, the baseline axis is denoted as "x," and the array 10 includes elements 12 and 14, with element 14 rotated by angle $\alpha$ with respect to the axis x and the orientation of the element 12. The output ports 12A and 14A of the elements 12 and 14 are connected to respective mixer circuits 16A and 16B for mixing with a local oscillator (LO) signal to downconvert the signals received at the array elements, and then amplified by respective amplifiers 18A, 18B to provide respective complex voltages $V_1$ and $V_2$. These output voltages are provided to a receiver/processor 20, which computes the estimated angle of arrival of the signal from the source, in accordance with the invention.

Figure 1B:
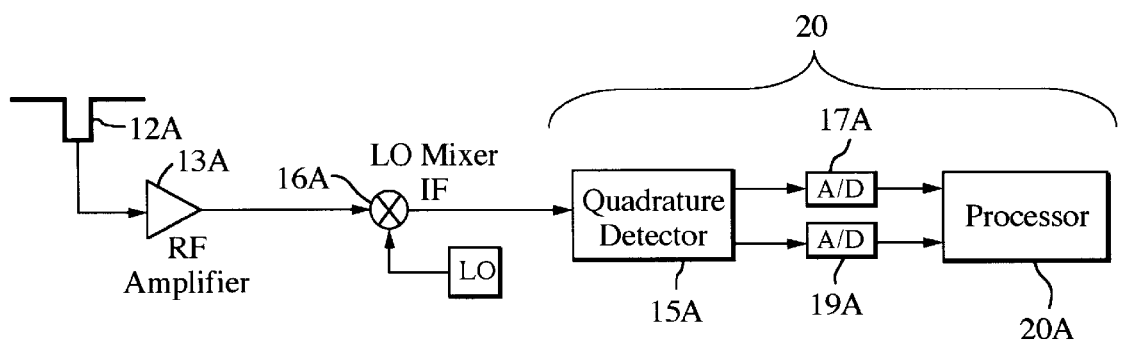
FIG. 1B is a more detailed schematic of an exemplary implementation of the detection apparatus useful in the system diagram of FIG. 1A.

FIG. 1B illustrates an exemplary detection technique for detecting the received signals, in this example only at array element 12A. The signal from the array element 12A is amplified by an RF amplifier 13A before downconversion to IF by the LO mixer 16A. The downconverted signal is then detected by a quadrature detector 15A which outputs two voltages, i.e. the in-phase (I) and the quadrature (Q) voltages. The I and Q voltages provide two channels which are digitized by analog-to-digital convertors 17A and 19A. The digitized I and Q signals form a pair of number (I, Q) that can be treated as one complex number, i.e. z=I+jQ. The processor 20A can be a general purpose embedded processor, a digital signal processor, or a PC for a rack mounted system. It will be appreciated that similar two channel quadrature detectors will be employed for each array element forming the detection system 10.

In general, and depending upon the polarimetrics of both the antenna elements and the source, the electrical phases of the received voltages $V_1$ and $V_2$ are no longer equal but are dictated by the polarimetric interaction of the antennas with the source. Each antenna, i.e. the source emitter antenna and the receiver antenna, can be characterized by the strength and orientation of its E-field. The interaction of these E-fields results in a voltage at the output terminals of the antenna. If there are two identical receive antennas, with like orientation with regard to the source emitter, then the output voltage of the two receive antennas have like polarimetric interaction, and the two output signals differ only by a phase shift due to time-of-arrival. The polarimetric interaction of a transmit antenna (emitter) and a receive antenna results in a voltage output ($V_{out}$) which is usually expressed as $V_{out} = E_{trans} * E_{recvr}$, where Etrans, Erecvr are vectors of length 2 representing the two orthogonal polarization components of the antenna E field, and * represents a vector dot product. Typically the chosen basis set is either horizontal and vertical polarization components of right-hand circular (RHC) and left-hand circular components (LHC).

Even though the polarimetrics of the elements or the source is not known, the relative phase shift between the two elements can be computed in accordance with the invention. This is possible because the polarimetrics of the rotated element are expressible in terms of the polarimetrics of the other element and the angle $\alpha$.

Further, and importantly, the polarimetricly induced voltage component of the one element relative to the other element is expressible in terms of α and one other (complex) number, here called the polarimetric ratio ζ. This is true even if the source is not directly ahead of the array, but still lies within the region of radial symmetry of the antenna patterns. Most (but not all) antennas are built to generate a spatial gain pattern that exhibits an axis of radial symmetry. Consequently, the antenna gain pattern can be described in terms of the "main beam beamwidth." Characteristically, the polarimetric vector which describes the E-field within this region does not change significantly anywhere within this region. Since in this exemplary embodiment of the invention, each of the receive antennas 12A, 12B . . . have like polarimetric characteristics, the received signal (usually) must be received in the main beam of each antenna (which is a region of symmetry). Note that there are other region of symmetry, usually called "sidelobes." If the received signal falls within the same sidelobe for all receive antennas, the exemplary embodiment of the algorithm can still be applied. Conversely, if the received signal is falling within an antenna null (in which case it would not likely be detected to begin with), then the assumption of like polarimetric characteristics for all receive antennas is suspect. (When the region of symmetry is large and the source is considerably off axis, one may have to deal with $α_p$, the projected angle of rotation).

Consequently, the measured voltages at each element can be expressed as a function of the unknown direction-of-arrival angle of the source, Ω, the unknown polarimetric ratio ζ, and the known antenna orientation α.

Now, given three antenna elements (and hence three voltage measurements), one can solve for the two unknowns, Ω and ζ. However, while both Ω and ζ affect the measured electrical phases, only ζ can affect the measured power. Thus ζ can be solved for on the basis of the power measurements only. Hence even a two element interferometer can be solved for both Ω and ζ. The fact that ζ only affects power is a second important principal of the algorithm (the first being that ζ exists).

A third aspect of this algorithm is the recognition that, even for a set of more than 2 elements, each having a different orientation, only one ζ is required to describe the polarimetric interactions. This is a consequence of a unique property of rotation matrices, namely that all rotation matrices have the same eigenvectors, and their eigenvalues are only functions of the rotation angle α.

The algorithm is illustrated in the flow diagram of FIG. 2, and can be summarized as follows:

Given a set of N identical elements, where each element has an orientation relative to some reference element of $α_n$, and each element has a measured complex voltage of $V_n = M_n e^{jΨ_n}$ (step 102). The source direction-of-arrival Ω is solved as follows:

1. Compute the measured powers $\{p_n\}$ and the measured phases $\{Ψ_n\}$ from the measured complex voltages of $\{V_n\}$ (Step 104).
2. Given $\{p_n\}$ and $\{α_n\}$, solve for ζ using a best-fit technique (Step 106).
3. Given ζ, compute the estimated polarimetric phase components $\{Ψ_n\}$ (Step 108).
4. Compute the corrected phase measurements using the estimated polarimetric phase components (Step 110).
5. Using the corrected phase measurements $\{Ψ_n - Ψ_n\}$, solve for the angle of arrival Ω (Step 112).

The first step is trivial, and the last step is a solved problem using known interferometric techniques. Thus, it is only necessary to show what equations relate $\{p_n\}$, $\{α_n\}$, ζ and $\{Ψ_n\}$. To do this, again consider the simple two element system shown in FIG. 1, and let $e_H$ and $e_V$ be the horizontal/vertical polarimetric basis set. Then the polarimetric vector of the first element 12 can be expressed as:

$e_1 = ae_H + be_V$, where a and b unknown complex scalars.

Similarly, the polarimetric vector of the source can be expressed as:

$e_T = ce_H + de_V$, where c and d unknown complex scalars.

The polarimetric component of the voltage at the first element is:

$v_1 = ac + bd$

Now, the polarimetric vector of the second element 14 is expressible as $e_2 = R(α)*e_1$ where $R(α)$ is the square rotation matrix $\{[\cos(α) \sin(α)] [-\sin(α) \cos(α)]\}$, and * is the matrix multiply operation.

As previously stated, the rotation matrix R has the eigenvectors $e_R$ and $e_L$, usually interpreted as the right-hand circular and left-hand circular basis set. The associated eigenvalues are $e^{jα}$ and $e^{-jα}$. Thus, the $e_1$ and $e_2$ can be expressed in terms of this basis set, which results in the following equations:

$e_1 = ae_R + be_L$, where a and b unknown complex scalars.

Similarly, the polarimetric vector of the source can be expressed as:

$e_T = ce_R + de_L$, where c and d are unknown complex scalars.

The polarimetric component of the voltage at the first element is:

$v_1 + ac + bd = ac(1 + bd/ac) = ac(1+ζ)$, where ζ is defined as bd/ac.

Now, the polarimetric vector of the second element is expressible as $e_2 = ae^{jα}e_R + be^{-jα}e_L$ And finally $v_2 = ac\ e^{jα} + bd\ e^{-jα} = ac(e^{jα} + bd/ac\ e^{-jα}) = ac(e^{jα} + ζe^{-jα})$ α is the rotational angle between the reference element 12 and element 14 under consideration. The following equation obtains:

$v(α) = v_1(e^{jα} + ζe^{-jα})(1+ζ)^{-1}$ where $v_1$ is the voltage of the reference element. From this, the power relationship can be derived, which is:

$p(α) = p_1(1 + 2*M*\cos(2α - β) + M^2)(1 + 2*M*\cos(β) + (M^2))^{-1}$, where $Me^{jβ} = ζ$.

Thus p(α) is the equation used in step 2, and v(α) is the equation used in step 3. It should be noted that if ζ is a solution to p(α), then so is $ζ^{-1}$. Therefore steps 3 and 4 may have to be repeated using both values of ζ in order to determine which value of ζ is correct. This is trivial, since the statement is equivalent to the statement that either $\{Ψ_n\}$ or $\{-Ψ_n\}$ is the correct solution, and this ambiguity be solved by using the set which best matches the measured phases $\{Ψ_n\}$.

With the existence and derivation of ζ demonstrated, the steps of the direction finding algorithm are restated in the following manner:

Given a set of N identical elements, where each element has an orientation relative to some reference element of $α_n$, and each element has a measured complex voltage of $v_n=M_n e^{j\Psi_n}$. The source direction-of-arrival $\zeta$ can be derived as follows:

1a. Compute the measured powers $\{p_n\}$ and the measured phases $\{\Psi_n\}$ from the measured complex voltages of $\{v_n\}$.

1b. Choose one element as the reference element.

Usually this will be the element with the peak power return or a fixed choice. Compute the set of rotations $\{\alpha_n\}$ relative to this element. The set of measurements $\{p_n\}$, $\{\Psi_n\}$, and $\{\alpha_n\}$ are the inputs to the algorithm.

2. Given $\{p_n\}$ and $\{\alpha_n\}$, find the best estimate for $\{M,\beta\}$ in the set of equations $$p_n=p_1(1+2M\cos(2\alpha_n-\beta)+M^2)(1+M^2)^{-1}.$$

This can be done using any of several numerical curve fitting techniques. One especially direct numerical technique first notes that the cosine term can be expanded into $2M\cos(2\alpha_n)\cos(\beta)+2M\sin(2\alpha_n)\sin(\beta)$. Then $2M\cos(\beta)$ and $2M\sin(\beta)$ can be treated as 2 independent variables. This allows the set of equations for $\{p_n\}$ to be expressed in matrix format and to be solved by the use of a pseudo-inverse technique.

3. Given $\zeta=Me^{j\beta}$, compute the estimated polarimetric phase components $\{\Psi_n\}$ using the equation $$\Psi_n=\arg((\exp(j\alpha_n)+\zeta\exp(-j\alpha_n))(1+\zeta)^{-1})$$

4. Using the corrected phase measurements $\{\Psi_n-\Psi_n\}$ solve for the angle of arrival $\Omega$.

With respect to the use of a pseudo-inverse technique in step 3 above, such a technique is a technique for solving a set of linear equations. Consider a linear set of equations, expressible in matrix form as $$y=Ax.$$

Then, x can be solved for as $$x=A^{-1}y.$$

This is a straightforward inverse, and requires that the length of x and y be the same. In the context of this algorithm, y is a set of measurements and x is a set of parameters to be estimated. Generally it is desired to have many more measurements than parameters, in which case the straightforward inverse becomes a pseudo-inverse, expressible as $$x=(A^TA)^{-1}A^Ty.$$

The pseudo-inverse technique results in a parametric vector x which gives the best mean-square-error fit to the data vector y. There are other techniques for solving such parameter estimation problems, such as the gradient descent technique. In this problem, which can be expressed in terms of sines and cosines, the use of an FFT (fast Fourier transform) is yet another technique.

The technique in accordance with this invention can also be applied in cases where the effective rotation angle $\alpha$ is not exactly known, but can be iteratively estimated. Such cases arise when the angle of arrival $\Omega$ is large (causing a change in $\alpha$ due to projection) or when dielectric lenses are used and cause an effective change in $\alpha$.

This invention allows for direction finding arrays to be more flexible in size and shape. Shown in FIG. 3 is one exemplary application, for a military aircraft 150, which has a conformal direction finding array 152 tuned to the commercial air traffic band. The array is mounted on the aft section of the aircraft skin or radome 154, and is conformal to the skin. The array 152 is part of a direction finding system mounted on the aircraft 150 which processes the signals from the array using the method described above with respect to FIGS. 1 and 2, to estimate the angle of arrival of signals from sources such as commercial airliner 170.

FIG. 4 shows another exemplary embodiment of a direction finding array 160, with three elements 162A, 162B and 162C mounted along the top edge of an existing planar array 164, which is typical of airborne active radars. In this case, the elements 162A–162C are placed along the outside edge of the planar array 164, in spaces not used by the existing planar array. If the elements were not placed at angles with respect to each other, there would be no room to place them on the existing planar array. Therefore, the elements 162A–162C are conformal in the sense that they must fit into existing spaces. The array comprising the three elements 162A–162C is part of a direction finding system mounted on an aircraft carrying the array, which processes the signals from the array using the method described above with respect to FIGS. 1 and 2, to estimate the angle of arrival of signals from emitting sources.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An interferometric method for estimating the angle of arrival of a signal from a source, using an antenna array having antenna elements with arbitrary orientation, where each element has an orientation $\alpha_n$ relative to some reference element, and each element has a measured complex voltage of $v_n=M_n e^{j\Psi_n}$, the method comprising:

computing the measured powers $\{p_n\}$ and the measured phases $\{\Psi_n\}$ from the measured complex voltages of $\{v_n\}$;

using the measured powers $\{p_n\}$ and $\{\alpha_n\}$, solving for a polarimetric ratio $\zeta$;

using $\zeta$, computing a set of estimated polarimetric phase components $\{\Psi_n\}$; and using the corrected phase measurements $\{\Psi_n-\Psi_n\}$, solving for the angle of arrival $\Omega$;

wherein the polarimetric ratio is defined by $\zeta=bd/ac$, the polarimetric vectors $e_n$ of the antenna elements represented with eigenvectors $e_R$ and $e_L$, the right-hand circular and left-hand circular basis set, the polarimetric vector $e_1$ for the first element is expressed in terms of this basis set as:

$e_1=ae_R+be_L$, where a and b represent unknown complex scalars, and the polarimetric vector of the source is expressed as:

$e_T=ce_R+de_L$, where c and d are unknown complex scalars; and wherein the set of estimated polarimetric phase components $\{\Psi_n\}$ is defined as:

$\Psi_n=\arg((\exp(j\alpha_n)+\zeta\exp(-j\alpha_n))(1+\zeta)^{-1}).$

2. The method of claim 1 wherein the array includes at least two identical elements.

3. The method of claim 1 wherein said step of solving for a polarimetric ratio includes using a best-fit technique.

4. The method of claim 1 wherein said antenna elements has like polarization characteristics.

5. An interferometric method for estimating the angle of arrival of a signal from a source, using an antenna array having antenna elements with arbitrary orientation, and each element has a measured complex voltage of $v_n = M_n e^{j\Psi_n}$, the method comprising the following steps:

computing the measured powers $\{p_n\}$ and the measured phases $\{\Psi_n\}$ from the measured complex voltages of $\{v_n\}$;

selecting one element of the array as a reference element;

computing the set of rotations $\{\alpha_n\}$ relative to the reference element;

from $\{p_n\}$ and $\{\alpha_n\}$, providing an estimate for $\{M,\beta\}$ in the set of equations $$p_n = p_1(1+2{*}M{*}\cos(2\alpha-\beta)+M^2)(1+2{*}M{*}\cos(\beta)+(M^2))^{-1};$$

using $\zeta = Me^{j\beta}$, computing the estimated polarimetric phase components $\{\Psi_n\}$ using the equation $$\Psi_n = \arg((\exp(j\alpha_n)+\zeta\exp(-j\alpha_n))(1+\zeta)^{-1}); \text{ and}$$

using the corrected phase measurements $\{\Psi_n - \Psi_n\}$, determining the angle of arrival $\Omega$.

6. The method of claim 5, wherein the step of selecting the reference element includes selecting as the reference element the array element having a peak power return.

7. The method of claim 5, wherein the step of finding the estimate for $\{M,\beta\}$ comprises using a best fit technique to select the estimate.

8. The method of claim 7, wherein the best fit technique includes expanding the cosine term into $2M\cos-(2\alpha_n)\cos(\beta)+2M\sin(2\alpha_n)\sin(\beta)$, treating $2M\cos(\beta)$ and $2M\sin(\beta)$ as 2 independent variables, expressing the set of equations for $\{p_n\}$ in matrix format, and solving the equations by the use of a pseudo-inverse technique.

9. The method of claim 5, wherein each of the elements has like polarization characteristics.

10. An apparatus for estimating the direction of arrival of a signal from a source, comprising:

an antenna array comprising at least two antenna elements with arbitrary orientation, wherein each element has an orientation $\alpha_n$ relative to a reference element;

measurement apparatus for measuring a complex voltage $v_n = M_n e^{j\Psi_n}$ for each element of the array resulting from the signal;

a signal processor responsive to the measured complex voltages for estimating the angle of arrival of the signal at the antenna array, the signal processor including means for computing the measured powers $\{p_n\}$ and the measured phases $\{\Psi_n\}$ from the measured complex voltages of $\{v_n\}$, means for calculating $\zeta$ using the measured powers $\{p_n\}$ and $\{\alpha_n\}$, means for computing estimated polarimetric phase components $\{\Psi_n\}$ using $\zeta$, and means for determining the angle of arrival $\Omega$ using the corrected phase measurements $\{\Psi_n - \Psi_n\}$; and wherein $\zeta$ is defined as $bd/ac$, the polarimetric vectors $e_n$ of the antenna elements represented with eigenvectors $e_R$ and $e_L$, the right-hand circular and left-hand circular basis set, the polarimetric vector $e_1$ for the first element is expressed in terms of this basis set as:

$e_1 = ae_R + be_L$, where a and b represent unknown complex scalars, and the polarimetric vector of the source is expressed as:

$e_T = ce_R + de_L$, where c and d are unknown complex scalars, and the polarimetric component of the voltage at the first element is:

$v_1 + ac + bd = ac(1+bd/ac) = ac(1+\zeta)$; and wherein the set of estimated polarimetric phase components $\{\Psi_n\}$ is defined as:

$$\Psi_n = \arg((\exp(j\alpha_n)+\zeta\exp(-j\alpha_n))(1+\zeta)^{-1}).$$

11. The apparatus of claim 10, wherein each of the elements has like polarization characteristics.

* * * * *